United States Patent Office 2,730,532

Patented Jan. 10, 1956

2,730,532

EPOXY-SUBSTITUTED ESTERS OF SILICON ACIDS AND THEIR PREPARATION

Robert W. Martin, Lafayette, Calif., assignor to Shell Development Company, Emeryville, Calif., a corporation of Delaware No Drawing. Application July 20, 1953, Serial No. 369,233

15 Claims. (Cl. 260—348)

This invention relates to a new class of organic compounds containing silicon and to a method for their preparation. More particularly, the invention relates to novel epoxy-substituted esters of silicon acids, to the preparation of the esters and to their utilization, particularly as stabilizing agents and lubricants and as monomers for the preparation of valuable polymeric products.

Specifically, the invention provides new and particularly useful organic compounds which may be described as esters of (1) alcohols containing at least one epoxy group, i. e., a

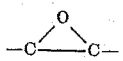

group, and (2) acids having a silicon atom attached to an acidic —OH group.

The invention also provides polymers of the above-described esters, and particularly the above-described esters which contain a plurality of the epoxy groups, which polymers are obtained by polymerizing the esters by themselves or with other epoxy-substituted materials, such as the polyepoxide reaction products of bis-phenol and epichlorohydrin.

It is an object of the invention to provide a new class of silicon-containing organic compounds. It is a further object to provide novel epoxy-substituted esters of silicon acids, and to a method for their preparation. It is a further object to provide novel epoxy-substituted esters of silicon acids which are useful and valuable in industry, particularly as stabilizers for halogen-containing polymers, such as poly(vinyl chloride). It is a further object to provide novel epoxy-substituted esters of silicon acids that are particularly useful and valuable as lubricants and softening agents for synthetic resins. It is a further object to provide a new group of epoxy-substituted compounds which may be used in preparing valuable polymeric products. It is a further object to provide new and improved polymeric products of epoxy-containing materials. Other objects and advantages of the invention will be apparent from the following detailed description thereof.

It has now been discovered that these and other objects may be accomplished in part by the novel compounds of the invention comprising esters of (1) alcohols containing at least one epoxy group, and (2) acids having a silicon atom attached to an acidic —OH group. It has been found that these particular esters possess many unobvious superior properties which make them particularly adapted for important commercial applications. The novel esters are, for example, good stabilizers for polymers, such as the halogen-containing polymers, and endow the resulting compositions with increased resistance to decomposition by heat and light. They are also of value as stabilizing agents for various oils and paints and lubricating and grease compositions. The novel esters, and particularly those that are liquid and relatively high boiling, are also valuable in the role of a plasticizer and softening agent for synthetic resins and rubbers. When added to polymers, such as poly(vinyl chloride), they may thus act both as a plasticizing agent and as a stabilizing agent.

It has also been found that when the above-described novel esters are treated with certain catalytic materials, such as primary and secondary amines, they polymerized through the epoxy linkage to form useful and valuable polymeric products. They may be polymerized in this manner by themselves or with other mono- and polyepoxide materials. As indicated hereinafter, particularly valuable products are obtained by copolymerizing the novel esters with polyepoxide reaction products of epichlorohydrin and bis-phenol.

The epoxy-substituted alcohols, the esters of which are provided by the present invention, comprise those alcohols having at least one 1,2-epoxy group, i. e., a

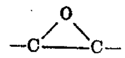

group, in their molecule, said group being preferably not more than four carbon atoms removed from the terminal hydroxyl group. The alcohols may be monohydric, saturated, unsaturated, branched or unbranched and open-chain. Examples of these alcohols include:

2,3-epoxypropanol
3,4-epoxybutanol
2,3-epoxyhexanol
5,6-epoxyoctanol
3,4-epoxyhexanediol-1,6
2,3-dimethyl-4,5-epoxyoctanol
2-methoxy-4,5-epoxyoctanol
2,3-epoxydodecanol Preferred epoxy-substituted alcohols are the epoxy-substituted aliphatic monohydric alcohols containing from 3 to 15 carbon atoms, such as 3,4-epoxybutanol, 5,6-epoxydecanol, 2,3-epoxyoctanol, 3,4-epoxydodecanol and 2-methyl-2,3-epoxypropanol. Particularly preferred alcohols are the monoepoxy-substituted alkanols containing from 3 to 8 carbon atoms, and having the epoxy group in the terminal position. 2,3-Alkanols, such as 2,3-epoxypropanol, are of special interest, particularly because of the ease of preparation of their resulting esters as well as the superior properties possessed by such esters.

The silicon acids, novel esters of which are provided by the present invention, comprise those compounds having at least one silicon atom attached directly to an acidic —OH group, such as, for example, the silicic acids, such as orthosilicic acid, metasilicic acid, orthodisilicic acid, metadisilicic acid, tetrasilicic acid and orthotrisilicic acid and substituted acids, such as Methyltrihydroxysilane
Phenyltrihydroxysilane
Butyltrihydroxysilane
Cyclohexyltrihydroxysilane
Phenylmethyldihydroxysilane
Phenylcyclohexyldihydroxysilane
Tolyltrihydroxysilane
Dimethyldihydroxysilane
Dihexyldihydroxysilane
Vinyltrihydroxysilane
Allyltrihydroxysilane
Methylsiliconic acid
Butylsiliconic acid
Phenylsiliconic acid
Cyclohexylsiliconic acid and partial esters of the above-described polybasic acids, such as Dibutoxydihydroxysilane
Phenoxytrihydroxysilane Allyloxytrihydroxysilane
Diisopropyldihydroxysilane
Vinyloxydihydroxysilane
Cyclohexyloxytrihydroxysilane cyclic compounds containing silicon, such as 1-hydroxy-1-silacyclohexane as derived from the chlorides shown in U. S. 2,615,033, hydroxy-substituted disiloxanes, such as, for example, those derived from the chlorides shown in U. S. 2,629,726.

Particularly preferred silicon-containing acids, the novel esters of which are covered in the present invention, comprise the organo polybasic silicon acids having the silicon atom attached to at least one hydrocarbon radical such as an aryl, alkaryl, alkyl, arylalkyl, alkenyl, cycloalkenyl or cycloalkyl radical, and preferably an alkyl radical containing from 1 to 8 carbon atoms and an aryl radical containing no more than 12 carbon atoms, such as, for example, cyclohexyltrihydroxysilane, butyltrihydroxysilane, dibutyldihydroxysilane, butyltrihydroxysilane, phenyltrihydroxysilane, and the like. Other preferred silicon-containing acids are the polybasic acids having at least one of the hydrogen atoms of the —OH groups replaced by a hydrocarbon radical, such as an aryl, alkaryl, alkyl arylalkyl, alkenyl, cycloalkenyl or cycloalkyl radical, and preferably an alkyl radical containing from 1 to 8 carbon atoms and an aryl radical containing no more than 12 carbon atoms, such as, for example, methoxytrihydroxysilane, butoxytrihydroxysilane, phenoxytrihydroxysilane and diphenoxydihydroxysilane.

The novel esters of the invention derived from any one of the above-described acids with any one or more of the above-described alcohols may be exemplified by Tetra(2,3-epoxypropyl) silicate
Di(2,3-epoxypropoxy)diphenylsilane
Di(3,4-epoxybutoxy)dibutylsilane
Di(5,6-epoxyhexyloxy)phenylmethylsilane
Di(4,5-epoxyoctyloxy)phenylbutylsilane
Tri(2,3-epoxypropoxy)phenylsilane
Di(3,4-epoxybutoxy)diallylsilane
Di(3,4-epoxybutoxy)vinyloxymethylsilane
Di(3,4-epoxyhexyloxy)allyloxybutylsilane
Tri(2,3-epoxypropoxy)phenoxysilane
3,4-epoxyhexyloxytriphenylsilane
1-(2',3'-epoxypropoxy)-1-silacyclohexane
2,3-epoxypropoxytriphenoxysilane
Tri(2,3-epoxypropoxy)cyclohexylsilane
Di(2,3-epoxypropoxy)dihydroxysilane The preferred esters, i. e., those derived from the organo polybasic silicon acids and the polybasic ether-substituted silicon acids, and the epoxy-substituted monohydric alcohols, may be exemplified by the following:

Di(2,3-epoxypropoxy)diphenylsilane
Di(2,3-epoxypropoxy)ditolylsilane
Di(2,3-epoxybutoxy)dihexylsilane
Di(3,4-epoxyhexyloxy)dibutylsilane
Tri(3,4-epoxyhexyloxy)amylsilane
Tri(2,3-epoxybutoxy)phenylsilane
Di(4,5-epoxyoctyloxy)dibenzylsilane
Di(2,3-epoxypropoxy)dihexylsilane The novel esters of the invention are preferably prepared by treating the desired epoxy-substituted alcohol with a halosilane corresponding to the desired acid in the presence of a hydrogen halide absorbing material. This method of preparation may be illustrated by the following equation showing the preparation of di(2,3-epoxypropoxy)-dibutylsilane from dichlorodibutylsilane and 2,3-epoxypropanol:

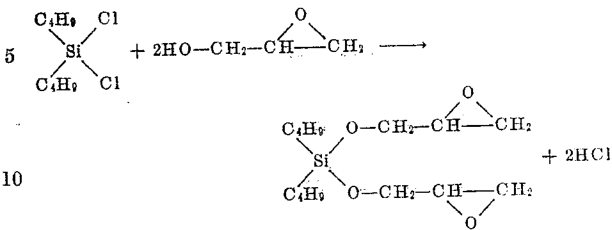

The type of reaction may be carried out by simply mixing the desired halosilane with the alcohol in an inert solvent, such as toluene or benzene, in the presence of a hydrogen halide absorbing material at relatively low temperatures. The reactants conveniently may be employed in substantially stoichiometrically required amounts, although in the event one reactant is more precious than the other a moderate excess of the less precious may be employed to insure high conversion of the other reactant to desired product. The reaction is preferably carried out at temperatures within the range of −10° C. to 30° C., and more preferably between the range of 0° C. to 15° C. In the event excessive heat is liberated in the reaction mixture, the reaction mixture may be cooled or the reaction may be maintained under control by dilution of the mixture with an inert solvent. The reaction may also be regulated by the controlled addition of one reactant, e. g., the halosilane may be added dropwise to the other reactant. The material used to absorb the hydrogen halide should be one that would not react with the halosilane or epoxy group or cause polymerization of the epoxide. Preferred materials are the rather weak inorganic bases and tertiary amines, such as triethylamine, triamylamine, pyridine, and the like. Upon completion of the reaction, any salt formed by the reaction of the added hydrogen-halide absorbing material and the liberated hydrogen halide may be removed from the reaction mixture by filtration or equivalent means and the filtrate suitably treated to recover the desired ester. In most cases, fractional distillation is the most convenient method for recovering the desired product although it will be appreciated that other applicable methods may be used.

The halosilanes that may be used in the above-described process may be any of the halo-substituted silanes but are preferably the chloro- or bromo-substituted silanes. Examples of these halosilanes include tetrachlorosilane, dibutyldichlorosilane, phenylcyclohexyldichlorosilane, methyltribromosilane, phenoxytrichlorosilane, phenyltrichlorosilane, methyltrichlorosilane, phenoxytribromosilane and dicyclohexyl dichlorosilane.

The novel esters may also be prepared by epoxidizing the corresponding unsaturated esters of the silicon acids.

The epoxidation of the unsaturated esters of the silicon acids is advantageously carried out by reacting the unsaturated ester with an epoxidizing agent at a temperature between about −20° C. to about 60° C. preferably under anhydrous conditions. Organic peracids, such as peracetic acid, perbenzoic acid, monoperphthalic acid and the like, are usually effective epoxidizing agents for this type of reaction. It is preferred to carry out the reaction in a suitable mutual solvent for the reactants' product. Chloroform is an especially useful solvent for this purpose, but other materials such as ethyl ether, dichloromethane, benzene, ethyl acetate, etc. are also suitable. The epoxy-substituted esters may be recovered from the reaction mixture by any suitable means, such as distillation, extraction and the like.

The unsaturated esters used in the above-described epoxidation reaction are preferably allylic-type esters, i. e., the esters of beta-gamma monoethyleneically unsaturated alcohols, as allyl alcohol, methallyl alcohol, crotyl alcohol and the like, such as, for example tetraallyloxysilane, allyloxytributylsilane, diallyloxydibutyloxysilane, and tetracrotyloxysilane.

The novel esters of the invention are substantially colorless relatively high-boiling liquids to semi-solids. They are soluble in a great many oils and solvents and are compatible with many synthetic resins and polymers, such as the vinyl chloride polymers. In combination with these materials they may act as a stabilizing agent against deterioration by heat, light, etc., and in combination with the polymers, such as vinyl chloride polymers, may act both as a stabilizing agent and as a plasticizing agent.

The novel esters generally have good lubricating properties and may act as lubricating oils or additives for other types of lubricating compositions. As additives they may act to increase their viscosity index or pour point properties.

The novel esters are also particularly useful in the preparation of valuable polymeric products. For this purpose they may be polymerized by themselves or with other types of epoxy-containing materials. The homopolymers of the novel esters containing only one epoxy group are preferably obtained by heating the monomers in the presence of aluminum chloride, aluminum bromide, bismuth trichloride, zinc chloride and boron trifluoride. About 1% to 10% of catalyst is usually sufficient to effect the desired degree of polymerization. It is generally preferred to accomplish the polymerization using this type of catalyst in a solvent, such as petroleum ether, chloroform, benzene, isopropyl ether, and the like. The temperature employed will generally vary between about −50° C. to 100° C., and more preferably between 0° C. and 60° C. The lower temperatures tend to give waxy solid type polymers, while the higher temperatures tend to give viscous liquid to soft solid polymers.

The polymerization of the novel esters containing a plurality of epoxy groups, such as the above-described special group of neutral esters of the 2,3-epoxyalkanols and the polybasic silicon acids, can be effected by treating the same with a great variety of different catalysts, such as amine catalysts as ethylene diamine, amine-aldehyde, or amide-aldehyde type resins, such as those prepared from formaldehyde and amides or amines as urea, thiourea, hydroxy urea, phenyl thiourea, and the like, diisocyanates, dialdehydes, polycarboxylic acids and the like. The amount of catalyst utilized will vary depending upon the type of reactants and catalyst selected, but in most cases will vary from about .1% to about 5% by weight. The temperatures employed in the polymerization may also vary over a wide range depending upon the reactants and catalyst. In most instances, the polymerization may be accomplished at temperatures between −15° C. to about 100° C., and more preferably between 20° C. and 60° C.

The properties of the polymers can be altered by copolymerizing them with other compounds. Thus, two or more different esters of the invention may be copolymerized together, or the esters can be copolymerized with other types of epoxy-containing materials, such as ethylene oxide, propylene oxide, isobutylene epoxide, epichlorohydrin, vinyl cyclohexene dioxide, butadiene mono- or dioxide, epoxy ethers, such as diglycidyl ether and glycidyl ethers of polyhydric phenols obtained by reacting a polyhydric phenol, such as bis-phenol, with an excess of a halogen-containing epoxide, such as epichlorohydrin, in an alkaline medium, polyepoxy polyethers obtained by reacting, preferably in the presence of an acid-acting compound, such as hydrofluoric acid, a halogen-containing epoxide, such as epichlorohydron, with a polyhydric alcohol, such as glycerol, ethylene glycol, hexanetriol, sorbitol, mannitol, pentaerythritol, polyglycerol, and the like, and subsequently treating the resulting product with an alkaline component to restore the epoxy group, and polyepoxide esters, such as di(2,3-epoxypropyl) adipate, and the like.

The polymers prepared from the monoepoxy-substituted esters as described may find use in the preparation of coating compositions, impregnating compositions and as additives for lubricating oils as viscosity index improvers and pour point depressants and as waterproofing agents for silica-gel greases and the like. The homopolymers and copolymers prepared from the epoxy-substituted esters having a plurality of epoxy groups are insoluble, infusible materials useful for the formation of pottings, castings and rigid plastic articles.

To illustrate the manner in which the invention may be carried out, the following examples are given. It is to be understood, however, that the examples are for the purpose of illustration and the invention is not to be regarded as limited to any of the specific conditions recited therein. Unless otherwise specified, parts disclosed in the following examples are parts by weight.

*Example I.—Di(2,3-epoxypropoxy)diphenylsilane*

About 22.2 parts of glycidol and 32 parts of triethylamine were dissolved in 150 parts of toluene. This solution was stirred rapidly and held at 0° C. to 10° C. while 37.85 parts of diphenyldichlorosilane was added dropwise. The triethylamine hydrochloride formed in the reaction was filtered off and the solvent removed by heating under a vacuum. The bottoms product was then distilled to yield the desired di(2,3-epoxypropoxy)diphenylsilane.

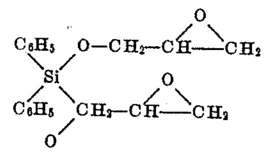

The ester was a fluid liquid having a boiling range of 197° C. to 205° C. The ester had an epoxide content of 0.521 eq./100 g. and a refractive index of 1.5570.

The above ester may be used as a synthetic lubricant and as a combined plasticizer-stabilizer for poly(vinyl chloride). The above ester when heated with 2,4,6-tri(dimethylaminomethyl)phenol formed a hard amber-colored resin.

Esters having related properties are obtained by replacing the diphenyldichlorosilane in the above-described process with equivalent amounts of each of the following: dibenzyldichlorosilane, ditolyldichlorosilane and di(butylphenyl)dichlorosilane.

*Example II.—2,3-epoxypropoxytributylsilane*

About 37 parts of glycidol and 60 parts of triethylamine are dissolved in 250 parts of toluene. This solution is stirred rapidly and held at 0° C. to 10° C. while 62 parts of chlorotributylsilane is added dropwise. The triethylamine hydrochloride formed in the reaction is filtered off and the solvent removed by heating the mixture under vacuum. The liquid bottoms product is identified as 2,3-epoxypropoxytributylsilane

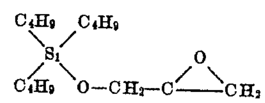

The above ester may be compatible with vinyl chloride polymer and act as a stabilizer-plasticizer for that polymer.

*Example III.—Di(2,3-epoxypropoxy)diphenoxysilane*

About 37 parts of glycidol and 60 parts of triethylamine are dissolved in 250 parts of toluene. This solution is stirred rapidly and held at 0° C. to 10° C. while 65 parts of dichlorodiphenoxysilane is added dropwise. The triethylamine hydrochloride formed in the reaction is filtered off and the solvent removed by heating the mixture under vacuum. The bottoms product is identified as di(2,3-epoxypropoxy) diphenoxysilane.

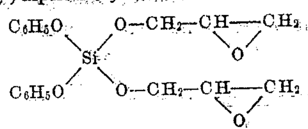

*Example IV.—Di(3,4-epoxybutoxy) dihexylsilane*

About 42 parts of 3,4-epoxybutanol and 60 parts of triethylamine are dissolved in 250 parts of toluene. This solution is stirred and held below 10° C. while 60 parts of dichlorodihexylsilane is added dropwise. The triethylamine hydrochloride formed in the reaction is filtered off and the solvent removed by heating under a vacuum. The liquid bottom product is identified as di(3,4-epoxybutoxy) dihexylsilane.

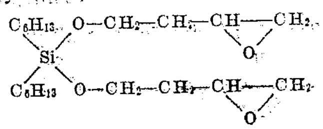

This ester may be used as a lubricant and as a combined stabilizer plasticizer for halogen-containing polymers. When 10 parts of the above ester is heated with 3 parts of 2,4,6-di(dimethylaminoethyl)phenol and 100 parts of an epichlorohydrin-bisphenol reaction product having a molecular weight of between 300 and 500, the resulting product is a hard, yellow colored resin.

I claim as my invention:

1. Epoxy-substituted compounds of the formula

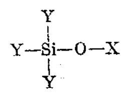

wherein X is an epoxy-substituted radical derived by removing an OH group from an epoxy-substituted alkanol containing 3 to 12 carbon atoms, and Y is a member of the group consisting of epoxy-substituted radicals derived by removing the hydrogen from the —OH group of an epoxy-substituted alkanol containing 3 to 12 carbon atoms, alkyl, alkenyl, cycloalkenyl radicals containing from 1 to 8 carbon atoms, aryl, alkaryl, arylalkyl radicals which are mononuclear and containing from 6 to 12 carbon atoms, alkoxy, alkenyloxy, cycloalkenyloxy radicals containing from 1 to 8 carbon atoms, aryloxy, alkaryloxy, arylalkoxy radicals which are mononuclear and containing from 6 to 12 carbon atoms.

2. A polymer of the epoxy compounds defined in claim 1.

3. A tri(epoxyalkoxy) alkylsilane wherein the epoxyalkoxy radical contains from 3 to 12 carbon atoms and the alkyl radical contains 1 to 8 carbon atoms.

4. A di(epoxyalkoxy) dialkylsilane wherein the epoxyalkoxy radical contains from 3 to 12 carbon atoms and the alkyl radical contains 1 to 8 carbon atoms.

5. A di(epoxyalkoxy) diarylsilane wherein the epoxyalkoxy radical contains from 3 to 12 carbon atoms and the aryl radical is mononuclear and contains from 6 to 12 carbon atoms.

6. A di(epoxyalkoxy) dialkoxysilane wherein the epoxyalkoxy radical contains from 3 to 12 carbon atoms and the alkoxy radical contains from 1 to 8 carbon atoms.

7. An ester of an epoxy-substituted alkanol containing from 3 to 12 carbon atoms and having the epoxy group in the terminal position, and silicic acid, the epoxy group remaining intact in the alcohol portion of the ester molecule.

8. Di(2,3-epoxypropoxy) dimethylsilane.

9. 2,3-epoxypropoxytributylsilane.

10. Di(2,3-epoxypropoxy) diphenylsilane.

11. A process for preparing an ester of an epoxy-substituted alkanol containing from 3 to 12 carbon atoms and a silicon acid having the formula $$\begin{array}{c} Y \\ | \\ Y-\text{SiOH} \\ | \\ Y \end{array}$$

wherein Y is a member of the group consisting of —OH, alkyl, alkenyl, cycloalkenyl radicals containing from 1 to 8 carbon atoms, aryl, alkaryl, arylalkyl radicals which are mononuclear and containing from 6 to 12 carbon atoms, alkoxy, alkenyloxy, cycloalkenyloxy radicals containing from 1 to 8 carbon atoms, aryloxy alkaryloxy, arylalkoxy radicals which are mononuclear and containing from 6 to 12 carbon atoms, the epoxy group in the said alcohol remaining intact in the ester molecule, which comprises reacting the epoxy-substituted alcohol with a halo-substituted silane having a formula as described above for the silicon acid wherein the OH group attached to silicon is replaced by a halogen atom in the presence of a hydrogen halide absorbing material comprising an amine at a temperature below about 30° C. and recovering the desired ester of the epoxy-substituted alcohol and the silicon acid from the reaction mixture.

12. A process as in claim 11 wherein the epoxy-substituted alcohol is glycidol.

13. A polymer of the epoxy-containing compound defined in claim 3.

14. A polymer of the epoxy-containing compound defined in claim 4.

15. A polymer of the epoxy-containing compound defined in claim 8.

References Cited in the file of this patent

UNITED STATES PATENTS

| | | |
|---|---|---|
| 2,566,364 | Pedlow | Sept. 4, 1951 |
| 2,650,934 | Rust | Sept. 1, 1953 |